United States Patent
Hughes et al.

(10) Patent No.: US 8,954,635 B2
(45) Date of Patent: Feb. 10, 2015

(54) BUFFER MANAGEMENT USING FREELIST BUFFERS

(75) Inventors: William Hughes, San Jose, CA (US); Chengping Yang, Fremont, CA (US); Michael K. Fertig, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 622 days.

(21) Appl. No.: 13/222,559

(22) Filed: Aug. 31, 2011

(65) Prior Publication Data

US 2013/0054864 A1    Feb. 28, 2013

(51) Int. Cl.
*G06F 3/00*    (2006.01)
*G06F 13/36*   (2006.01)

(52) U.S. Cl.
CPC ...................................... *G06F 13/36* (2013.01)
USPC ............................................ 710/52; 710/310

(58) Field of Classification Search
None
See application file for complete search history.

(56) References Cited

U.S. PATENT DOCUMENTS 5,166,930 A * 11/1992 Braff et al. ..................... 370/235
6,715,055 B1 * 3/2004 Hughes ............................ 710/52

* cited by examiner

*Primary Examiner* — Idriss N Alrobaye
*Assistant Examiner* — Dayton Lewis-Taylor

(57) ABSTRACT

A device includes a link interface circuit, a first plurality of allocated buffers, and a second plurality of non-allocated buffers. The link interface circuit is operable to communicate over a communications link using a plurality of virtual channels. A different subset of the plurality of allocated buffers is allocated to each of the virtual channels. The non-allocated buffers are not allocated to a particular virtual channel. The link interface circuit is operable to receive a first transaction over the communications link and assign the first transaction to one of the allocated buffers or one of the non-allocated buffers.

4 Claims, 3 Drawing Sheets

BUFFER MANAGEMENT USING FREELIST BUFFERS

CROSS-REFERENCE TO RELATED APPLICATIONS

Not applicable.

BACKGROUND

The disclosed subject matter relates generally to computer systems and, more particularly, to buffer management using freelist buffers.

In computer systems, devices communicate with one another over buses. The communication efficiency over the bus directly ties into the overall performance of the system. One bus technology used for high speed communication between devices is commonly referred to as HyperTransport (HT). In general, an HT bus is a bidirectional, serial/parallel, high-bandwidth, low-latency, point-to-point link.

In typical HT bus implementations a plurality of virtual channels are defined for communication between devices. Exemplary devices include microprocessors, graphics processors, I/O devices, bridge devices, external caches, network interfaces, cryptoprocessors, etc. Each device maintains a plurality of buffers for communicating across the channel. These buffers are hard-allocated for particular virtual channels. Exemplary channels include a request channel, a response channel, a posted request channel, a probe virtual channel, etc. Multiple virtual channels are provided to avoid deadlocks in the network. For example, without separate virtual channels, the buffers could be allocated to a plurality of request transactions, leaving no buffers available for responses.

For each channel, a number of buffers are hard-allocated for receiving packets of the particular type. The device transmitting the particular packet maintains a count of buffers available for each virtual channel. When a particular packet is sent over the channel, the available buffer count for that channel is decremented by the transmitting device. The receiving device decodes an incoming packet to identify the appropriate virtual channel, and stores the incoming packet in a buffer allocated for the appropriate virtual channel. As the receiving device completes particular requests, thereby freeing up previously used buffers, it sends to the transmitting device a buffer release packet indicating the number of buffers for the various virtual channels that have been released. By maintaining buffer counts for each virtual channel and tracking buffers as they are released, the relative bandwidths of the virtual channels can be controlled.

The performance of the HT bus is affected by the total number of buffers available for communication over the HT bus and the relative buffer counts hard-allocated to each virtual channel. In general, increasing the performance of the HT bus involves allocating more buffers to the various virtual channels. Increasing buffer counts increases the cost of the devices by consuming additional silicon real estate. The number of buffers hard-allocated to each virtual channel is also a performance compromise. The devices communicating over the bus will experience different workloads at different times depending on the particular tasks being performed. The general hard allocation scheme represents an average expected balance between the channels. If a particular task requires different relative uses the virtual channels, the performance of the HT bus may be negatively affected by less efficient usage. There may be a shortage of buffers for one virtual channel, while a different virtual channel experiences a surplus.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a device including a link interface circuit, a first plurality of allocated buffers, and a second plurality of non-allocated buffers. The link interface circuit is operable to communicate over a communications link using a plurality of virtual channels. A different subset of the plurality of allocated buffers is allocated to each of the virtual channels. The non-allocated buffers are not allocated to a particular virtual channel. The link interface circuit is operable to receive a first transaction over the communications link and assign the first transaction to one of the allocated buffers or one of the non-allocated buffers.

Another aspect of the disclosed subject matter is seen a method for communicating over a communications link using a plurality of virtual channels. The method includes allocating a first plurality of allocated buffers to the virtual channels. A different subset of the plurality of allocated buffers is allocated to each of the virtual channels. A second plurality of non-allocated buffers is designated. The non-allocated buffers are not allocated to a particular virtual channel. A first transaction is received over the communications link. The first transaction is assigned to one of the allocated buffers or one of the non-allocated buffers.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
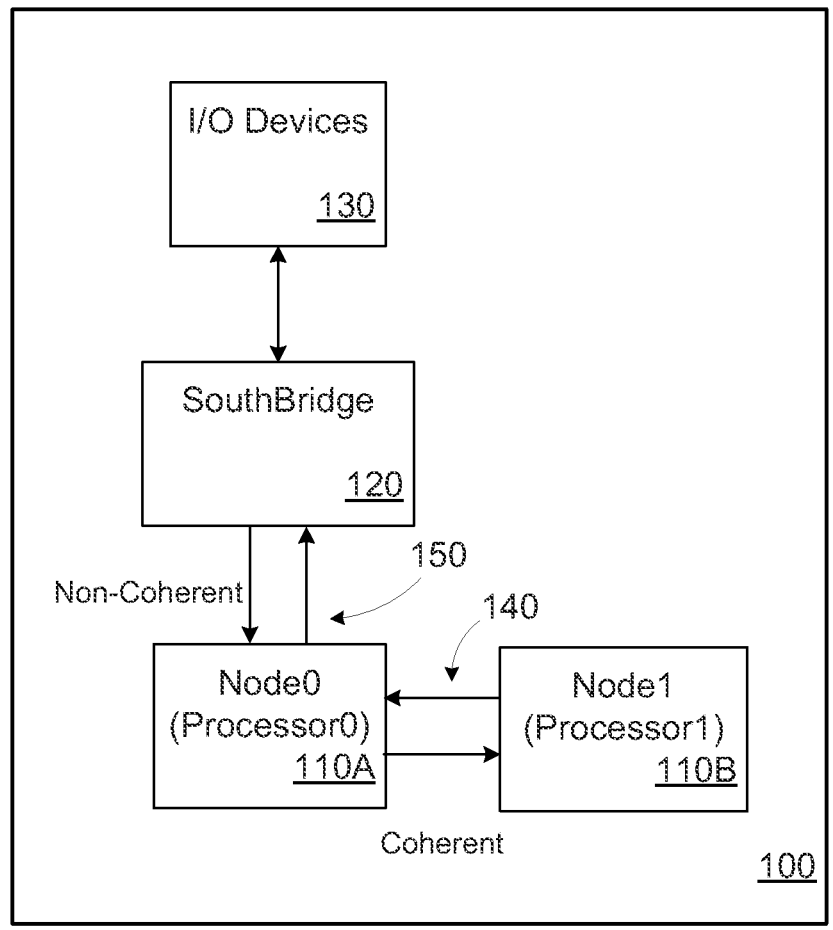
FIG. 1 is a simplified block diagram of a computer system in accordance with one illustrative embodiment of the present subject matter.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a computer system 100. The computer system 100 is illustrated in simplified form for ease of illustration and to avoid obscuring the present subject matter. The computer system includes a plurality of general nodes 110A, 110B, a southbridge node 120, and I/O devices 130 coupled to the southbridge node 120. In the illustrated embodiment, the nodes 110A, 110B, 120 communicate with one another using a HyperTransport (HT) protocol. Various types of devices may be installed as general nodes 110 in the system 100. A common general node 110A, 110B is a microprocessor. Other types of nodes include, but are not limited to, graphics processors (GPUs), input/output (I/O) devices, external caches, network interfaces, cryptoprocessors, etc.

In the illustrated embodiment, the southbridge node 120 performs various functions in the system 100, including, but not limited to, PCI bus support, ISA bus support, LPC bridge support (for Super I/O connections to keyboard, mouse, parallel port, serial port, IR port, floppy controller, etc.) BIOS flash storage, system management bus support, DMA controller support to allow ISA or LPC devices direct access to main memory without needing help from the CPU, interrupt control support, mass storage controller support to allow direct attachment of system hard drives, real-time clock support, power management, nonvolatile BIOS memory support, audio sound interface support, out-of-band management controller support, Ethernet support, RAID support, USB support, audio codec support, and/or FireWire support.

In general, the link between the general nodes 100 may be a coherent HT link 140, while the link 150 between the southbridge node 120 and one of the general nodes 110A, 110B may be non-coherent HT. In general, coherent HT links 140 provide interfaces between the processors' coherent domains, while non-coherent HT links 150 are used for attaching I/O devices, such as the I/O devices 130 attached through the southbridge node 120.

For purposes of the following illustrations, the application of the present subject matter is described in the context of the coherent HT link 140. However, the concepts may also be applied to the non-coherent HT link 150, or even a communication link between devices using a completely different protocol.

Figure 2:
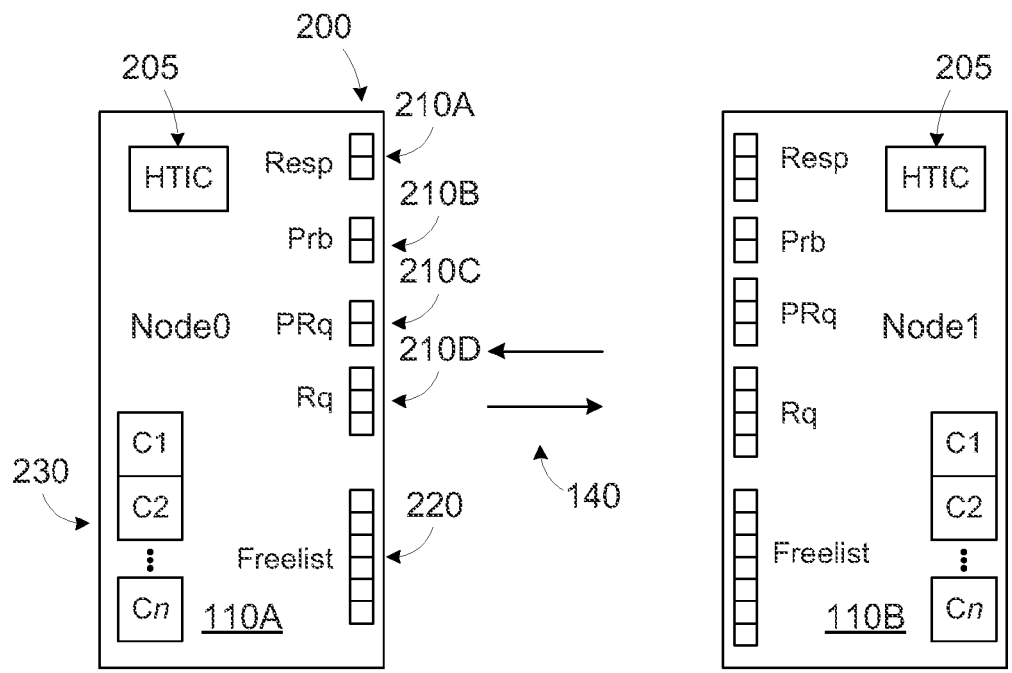
FIG. 2 is a diagram illustrating the use of hard-allocated and freelist buffers between two nodes in the system of FIG. 1.

Turning now to FIG. 2, a diagram illustrating the communication between the nodes 110A, 110B is provided. The devices communicate using a plurality of buffers 200 controlled by a HT interface circuit (HTIC) 205. Certain buffers 210 are hard-allocated to virtual channels, as designated by the lettered suffixes. Exemplary virtual channels, include, but are not limited to, a request channel (Rq), a response channel (Resp), a posted request channel (PRq), and a probe channel (Prb). Generally, communication using a hard-allocated virtual channel is limited by the number of available buffers 210 available for that channel. The HTIC 205 also implements a plurality of freelist buffers 220, also referred to as non-allocated buffers, that may be used to support communication that may have otherwise been implemented using one of the hard-allocated virtual channels. The freelist buffers 220 allow the hard-allocated channel limits to be exceeded, and because the freelist buffers 220 may be used to support any of the virtual channels, the available bandwidth for each virtual channel may vary dynamically to support changing workload requirements. Each node 110, 110B may have a different number of total buffers 200, and also, the numbers of the hard-allocated buffers 210 for each virtual channel and the freelist buffers 220 may vary. The HTIC 205 of the transmitting device keeps track of the free buffers 210 available in the receiving device for each of the virtual channels and the number of available freelist buffers 220 using a plurality of counters 230. As the receiving devices retires buffers 200, its HTIC 205 sends a release packet is sent to the transmitting device indicating the channels for which buffers 200 have been released (hard-allocated virtual channel or freelist).

Figure 3:
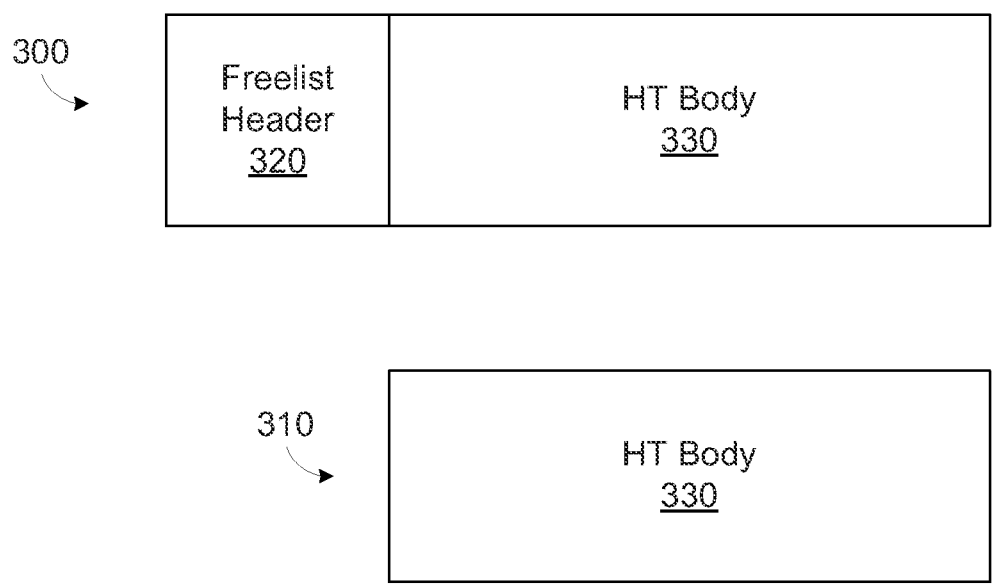
FIG. 3 is a diagram of packets sent over a communication bus in the system of FIG. 1.

Turning now to FIG. 3, exemplary transactions 300, 310 that may be communicated over the HT link 140 are illustrated. The transaction 300 includes a freelist header 320 and an HT body 330. The type of command is encoded in the HT body 330. In conventional devices without freelist buffers 220, the HTIC 205 of the receiving device would decode the HT body 330 to determine the associated virtual channel. When implementing freelist buffers 220, it becomes necessary to inform the receiving device whether the incoming transaction 300, 310 should be allocated to one of the hard-allocated virtual buffers 210 or with one of the freelist buffers 220. The freelist header 320 is appended to the HT body 330 in the transaction 300 to provide the appropriate buffer routing information.

There are various ways in which the hard-allocated buffers 210 and the freelist buffers 220 may be managed. In one embodiment, freelist headers 320 may be provided for every transaction 300. The HTIC 205 of the receiving device decodes the HT packet to determine the type of transaction, and uses the freelist header 320 to determine if a hard-allocated buffer 210 or a freelist buffer 220 should be used. The HTIC 205 of the transmitting device decrements the buffer counter 230 for the hard-allocated buffer 210 or the freelist buffer 220 used. Upon retiring the transaction, the receiving device sends a release packet to the transmitting device, and the transmitting device increments the associated counter 230 to restore the available buffers 210, 220.

In another embodiment, the freelist header 320 is not used on certain transactions 310. The freelist header 320 is only used to communicate that a buffer routing that differs from a default buffer routing is being used. In one embodiment, the majority of buffers 200 may be freelist buffers 220, and all virtual channels may be configured to default to the freelist buffers 220. This configuration reduces the latency affect by reducing the throughput for the default transactions 310. Only those transactions 300 targeting a hard-allocated buffer 210 would require a freelist header 320.

In another embodiment, a different default buffer routing may be determined for each virtual channel. For example, requests can be configured to default to a hard-allocated buffer 210 for the request virtual channel, while responses can be configured to default to the freelist buffers 220. Default transactions 310 for requests and responses can then be communicated without a freelist header 320, thereby increasing throughput. In such a configuration, freelist headers 320 would only be necessary if the request were to be processed using a freelist buffer 220 or a response were to be processed using a hard-allocated buffer 210 for the response virtual channel.

Figure 4:
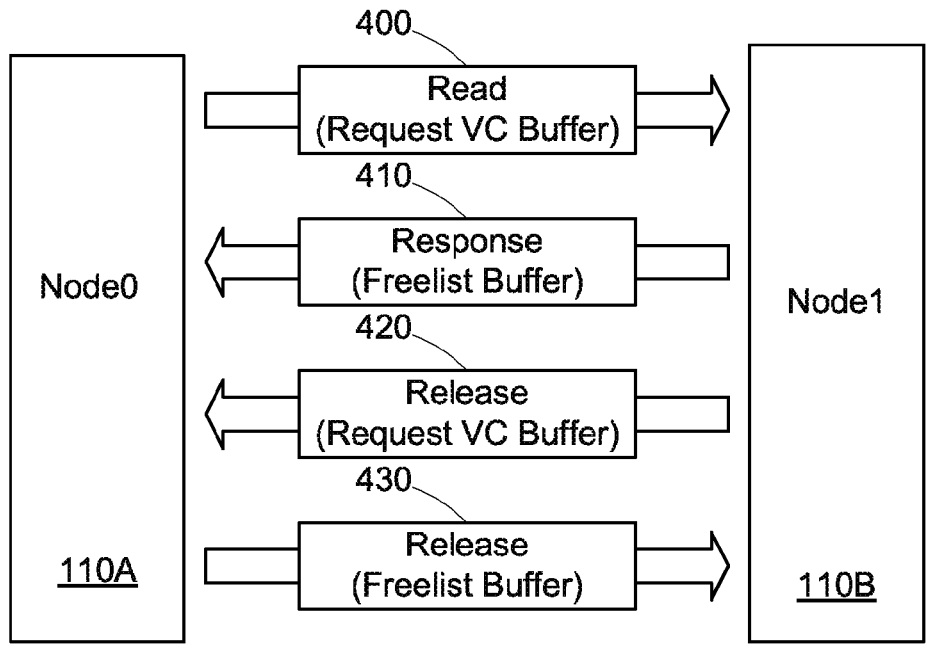
FIG. 4 is a diagram illustrating an exchange between nodes in the system of FIG. 1.

An exemplary transaction flow for this configuration is described in reference to FIG. 4. The node 110A issues a read request 400 to the node 110B. The node 110B decodes the transaction 400 and identifies the read request. Because the default routing for read requests is the hard-allocated buffers 210, the node 110B associates the transaction 400 with the request virtual channel and consumes a request buffer. The node 110A decrements its counter 230 for the request virtual channel hard-allocated buffers 210. The node 110B subsequently issues a response transaction 410 including the results from the previous read request 400. The node 110A decodes the transaction 410 and identifies the response. For this transaction, the default routing for response requests is the freelist buffers 220, so the node 110A associates the transaction 420 with the response virtual channel and consumes a freelist buffer 220. The node 110B decrements its counter 230 for the freelist buffers 220. After issuing the response transaction 410, the node 110B issues a release transaction 420 indicating that hard-allocated buffer 210 for the request virtual channel has been released, and the node 110A increments its counter 230 for the request virtual channel hard-allocated buffers 210. Similarly, after processing the response, the node 110A issues a release transaction 430 indicating that freelist buffer 220 has been released, and the node 110BA increments its counter 230 for the freelist buffers 220. The buffer is only held until the transaction has reached its local destination in the node 110B. Therefore, the request buffer release is independent of when the response is generated and reaches the HT link.

In one embodiment, the default configurations of the virtual channels may be fixed at the time the system 100 is initialized. In another embodiment, a particular node 110A, 110B may dynamically change its default buffer configuration. For example, if the type of task being processed by the node 110A, 110B changes, and it expected that the duration of the new environment would be sufficient to warrant a change, the node 110A, 110B may place the HT link 140 in a quiescent state and wait for all transactions to be completed and the associated buffers 200 released. The node 110A, 110B may then communicate its new default configurations to the opposing node, and communication may resume on the HT link 140 with the new default configurations in effect. The efficiency gained from changing the default configurations depends on factors such as the expected duration of new processing environment and the cost associated with placing the HT link 140 into a quiescent state.

Figure 5:
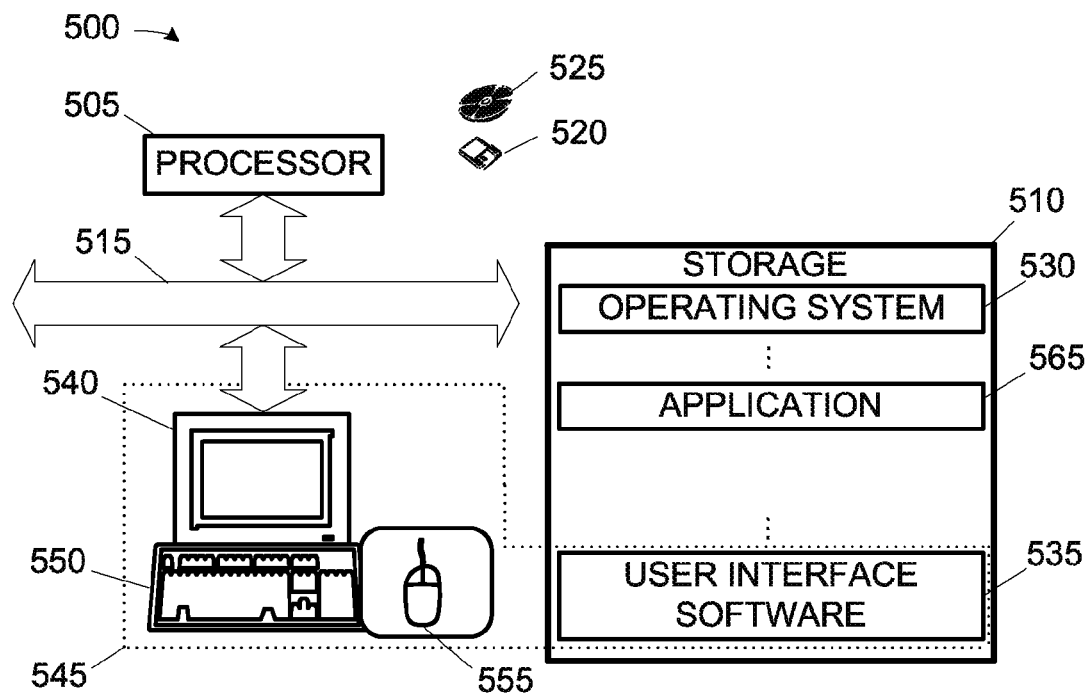
FIG. 5 is a simplified diagram of a computing apparatus that may be programmed to direct the fabrication of a node in the system of FIG. 1.

FIG. 5 illustrates a simplified diagram of selected portions of the hardware and software architecture of a computing apparatus 500 such as may be employed in some aspects of the present subject matter. The computing apparatus 500 includes a processor 505 communicating with storage 510 over a bus system 515. The storage 510 may include a hard disk and/or random access memory ("RAM") and/or removable storage, such as a magnetic disk 520 or an optical disk 525. The storage 510 is also encoded with an operating system 530, user interface software 535, and an application 565. The user interface software 535, in conjunction with a display 540, implements a user interface 545. The user interface 545 may include peripheral I/O devices such as a keypad or keyboard 550, mouse 555, etc. The processor 505 runs under the control of the operating system 530, which may be practically any operating system known in the art. The application 565 is invoked by the operating system 530 upon power up, reset, user interaction, etc., depending on the implementation of the operating system 530. The application 565, when invoked, performs a method of the present subject matter. The user may invoke the application 565 in conventional fashion through the user interface 545. Note that although a stand-alone system is illustrated, there is no need for the data to reside on the same computing apparatus 500 as the application 565 by which it is processed. Some embodiments of the present subject matter may therefore be implemented on a distributed computing system with distributed storage and/or processing capabilities.

It is contemplated that, in some embodiments, different kinds of hardware descriptive languages (HDL) may be used in the process of designing and manufacturing very large scale integration circuits (VLSI circuits), such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., storage 510, disks 520, 525, solid state storage, and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into the computing apparatus 500, and executed by the processor 505 using the application 565, which may then control, in whole or part, the operation of a semiconductor manufacturing facility (or fab) to create semiconductor products and devices. For example, in one embodiment, silicon wafers containing a node 110A, 110B of FIG. 1 or 2 may be created using the GDSII data (or other similar data).

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A device, comprising:
   a link interface circuit operable to communicate over a communications link using a plurality of virtual channels;
   a first plurality of allocated buffers, wherein a different subset of the plurality of allocated buffers is allocated to each of the virtual channels; and
   a second plurality of non-allocated buffers that are not allocated to a particular virtual channel, wherein the link interface circuit is operable to receive a first transaction over the communications link and assign the first transaction to one of the allocated buffers or one of the non-allocated buffers,
   wherein the link interface circuit is operable to assign the first transaction to one of the allocated buffers in the subset for a particular virtual channel associated with the first channel or one of the non-allocated buffers based on an opposite of a default routing associated with the particular virtual channel, responsive to the first transaction including a freelist header portion.

2. A device, comprising:
   a link interface circuit operable to communicate over a communications link using a plurality of virtual channels;
   a first plurality of allocated buffers, wherein a different subset of the plurality of allocated buffers is allocated to each of the virtual channels; and
   a second plurality of non-allocated buffers that are not allocated to a particular virtual channel, wherein the link interface circuit is operable to receive a first transaction over the communications link and assign the first transaction to one of the allocated buffers or one of the non-allocated buffers,
   wherein the link interface circuit is operable to receive a release packet from a remote device communicating to the device over the communication link indicating that (a) a buffer of the remote device associated with a particular channel has been released and increment a virtual channel counter associated with the particular channel responsive to receiving the release packet or (b) a non-allocated buffer of the remote device has been released and increment a freelist counter associated with the non-allocated buffers responsive to receiving the release packet.

3. A method for communicating over a communications link using a plurality of virtual channels, comprising:
   allocating a first plurality of allocated buffers to the virtual channels, wherein a different subset of the plurality of allocated buffers is allocated to each of the virtual channels; and
   designating a second plurality of non-allocated buffers that are not allocated to a particular virtual channel;
   receiving a first transaction over the communications link; and
   assigning the first transaction to one of the allocated buffers or one of the non-allocated buffers, further comprising:
   (a) assigning the first transaction to one of the allocated buffers in the subset for the particular virtual channel or one of the non-allocated buffers based on an opposite of a default routing associated with the particular virtual channel, responsive to the first transaction including a freelist header portion; or
   (b) decrementing a virtual channel counter associated with a particular virtual channel responsive to sending a second transaction to a remote device over a communications link that is assigned to the particular virtual channel; and receiving a release packet from the remote device indicating that a buffer of the remote device associated with the particular channel has been released and incrementing a virtual channel counter associated with the particular channel responsive to receiving the release packet.

4. The method of claim 3, further comprising:
   decrementing the freelist counter responsive to sending a second transaction to the remote device over the communications link that is assigned to a non-allocated buffer in the remote device; and receiving a release packet from the remote device indicating that a non-allocated buffer of the remote device has been released and incrementing the freelist counter associated responsive to receiving the release packet.

* * * * *